(12) United States Patent
Lundmark

(10) Patent No.: US 7,711,585 B2
(45) Date of Patent: May 4, 2010

(54) WEALTH REPLACEMENT RIDER

(76) Inventor: Jonathan Paul Lundmark, 5405 Troup Hwy., Suite 201, Whitehouse, Tyler, TX (US) 75707

( * ) Notice: Subject to any disclaimer, the term of this patent is extended or adjusted under 35 U.S.C. 154(b) by 1364 days.

(21) Appl. No.: 11/068,465

(22) Filed: Feb. 28, 2005

(65) Prior Publication Data
US 2006/0195374 A1 Aug. 31, 2006

(51) Int. Cl.
*G06Q 40/00* (2006.01)
(52) U.S. Cl. .............................. 705/4; 705/35; 705/36; 705/37; 705/38; 705/39; 705/40; 705/41; 705/42; 705/43; 705/44; 705/45
(58) Field of Classification Search ..................... 705/1, 705/4, 35–45
See application file for complete search history.

(56) References Cited

U.S. PATENT DOCUMENTS

| | | | |
|---|---|---|---|
| 5,754,980 A * | 5/1998 | Anderson et al. ............... | 705/4 |
| 6,611,808 B1 * | 8/2003 | Preti et al. ...................... | 705/4 |
| 7,228,286 B1 * | 6/2007 | Gamble, III ............. | 705/14.14 |
| 7,398,241 B2 * | 7/2008 | Fay et al. ................... | 705/36 R |
| 7,451,104 B1 * | 11/2008 | Hendrix et al. ............... | 705/35 |
| 7,496,598 B2 * | 2/2009 | Westendorf et al. ....... | 707/103 Y |
| 7,558,757 B2 * | 7/2009 | Conroy et al. ................. | 705/38 |
| 7,617,138 B1 * | 11/2009 | Gladden et al. ............... | 705/30 |
| 2003/0105652 A1 * | 6/2003 | Arena et al. .................... | 705/4 |
| 2003/0105690 A1 * | 6/2003 | Brown et al. .................. | 705/35 |
| 2003/0120573 A1 * | 6/2003 | Preti et al. ..................... | 705/35 |
| 2004/0030589 A1 * | 2/2004 | Leisher et al. ................. | 705/4 |
| 2004/0148202 A1 * | 7/2004 | Siefe et al. ..................... | 705/4 |
| 2004/0181436 A1 * | 9/2004 | Lange ............................ | 705/4 |
| 2005/0065809 A1 * | 3/2005 | Henze ........................... | 705/1 |
| 2007/0156558 A1 * | 7/2007 | Wolzenski et al. ............ | 705/35 |
| 2007/0255635 A1 * | 11/2007 | Multer et al. ............. | 705/36 R |

FOREIGN PATENT DOCUMENTS

WO    WO 02/39644    *  5/2002

OTHER PUBLICATIONS

Milevsky, G. et al. The Titanic Option: Valuation of the Guaranteed Minimum Death Benefit in Variable Annuities and Mutual Funds. The Journal of Risk Insurance, vol. 68, No. 1 (Mar. 20010), pp. 93-128.*

* cited by examiner

*Primary Examiner*—Charles R Kyle
*Assistant Examiner*—Robert R Niquette
(74) *Attorney, Agent, or Firm*—Frederick D. Hamilton

(57) ABSTRACT

A method for determining a death benefit with respect to a charitable gift annuity contract, the method determining the death benefit funded on an after-tax basis of the charitable gift annuity. The method comprises determining if a wealth replacement rider has been selected; and if the wealth replacement rider has been selected, calculating the amount of the death benefit to be funded on the after-tax basis. The method further comprises calculating the new charitable gift annuity payout.

18 Claims, 3 Drawing Sheets

WEALTH REPLACEMENT RIDER

CROSS-REFERENCE TO RELATED APPLICATIONS

Figure 1:
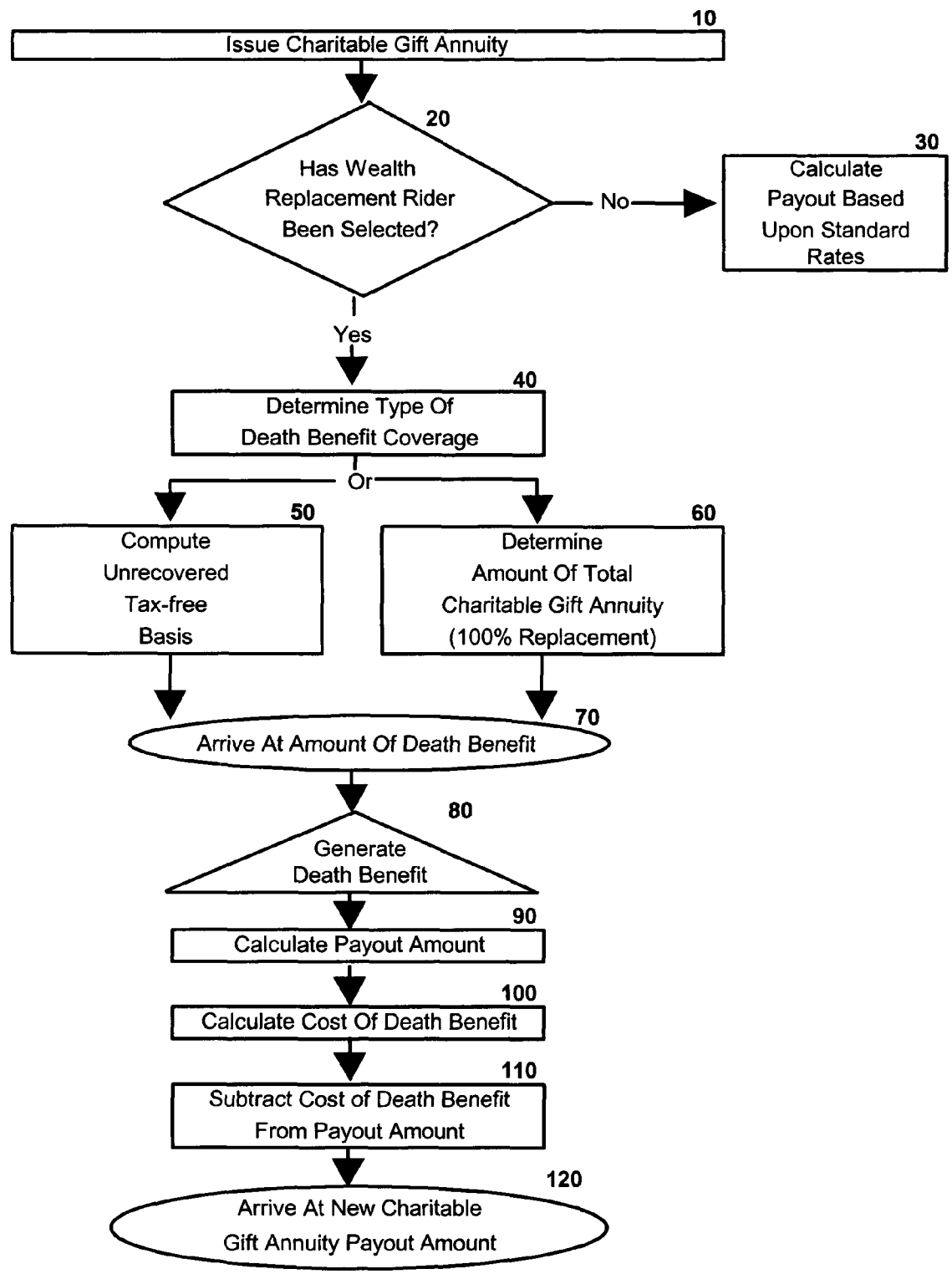

This application claims the benefit of provisional patent application Ser. No. 60/547,677, filed 2004 Feb. 25 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates generally to a charitable gift annuity, and more specifically to a method for determining a death benefit funded on an after-tax basis of the charitable gift annuity and for determining a new charitable gift payout.

2. Background of the Invention

A charitable gift annuity is a contract which transfers assets to a charitable organization in exchange for guaranteed, fixed income to an annuitant. The charitable gift annuity provides a means for individuals to blend together benevolent wishes, financial needs, and tax-advantaged strategies.

Charitable gift annuity payments are made to one or two annuitant(s) for life. Charitable gift annuity payments are a function of age and number of annuitant(s), the annuity rate, and the federal discount rate. Generally, payments are determined by the American Council on Gift Annuities' life expectancy tables and payout rate calculations.

State laws establish the amount of the asset or portion of the asset that the charitable organization must hold in reserve until the death of the charitable gift annuitant. The charitable organization receives an initial gift amount. The charitable gift donor receives an immediate income tax deduction equal to the initial gift amount.

At the gift annuitant's death, the unrecovered tax-free return basis of the charitable gift annuity becomes the property of the charitable organization. The charitable gift annuitant's beneficiaries receive no value from the charitable gift annuity when the annuitant dies. If the gift annuitant dies prior to life expectancy assumptions, the unrecovered portion of the payouts is considered "loss of wealth" in respect to the annuitant's estate portfolio. A major problem with gift annuities is that the surviving heirs and beneficiaries can not receive any benefit from the charitable gift annuity. If the gift annuitant does not reach his/her life expectancy, expected income is lessened as a result, and surviving heirs and beneficiaries are left without expected financial support.

In view of the foregoing, there is a need for a method by which the charitable gift annuitant can provide death benefits to surviving beneficiaries so that beneficiaries can receive income at the annuitant's death.

SUMMARY

The present invention provides a method for determining a death benefit funded on the after-tax basis of the charitable gift annuity so that the cost of the death benefit funded on the after-tax basis replenishes either the total charitable gift annuity amount upon death of the gift annuitant or the unrecovered tax-free basis of return if the gift annuitant dies prior to reaching life expectancy.

More particularly, the present invention provide a method for determining if the wealth replacement rider has been selected; and if so, determining the type of death benefit coverage chosen by the gift annuitant or donor. Based on the type of death benefit coverage selected, the death benefit is generated and the new payout amount is calculated.

A more complete understanding of the present invention and other objects, aspects, aims, and advantages thereof will be readily apparent to those skilled in the art when the following description of the preferred embodiment is read in conjunction with the accompanying drawings provided herein.

DRAWINGS—FIGURES

Figure 2:
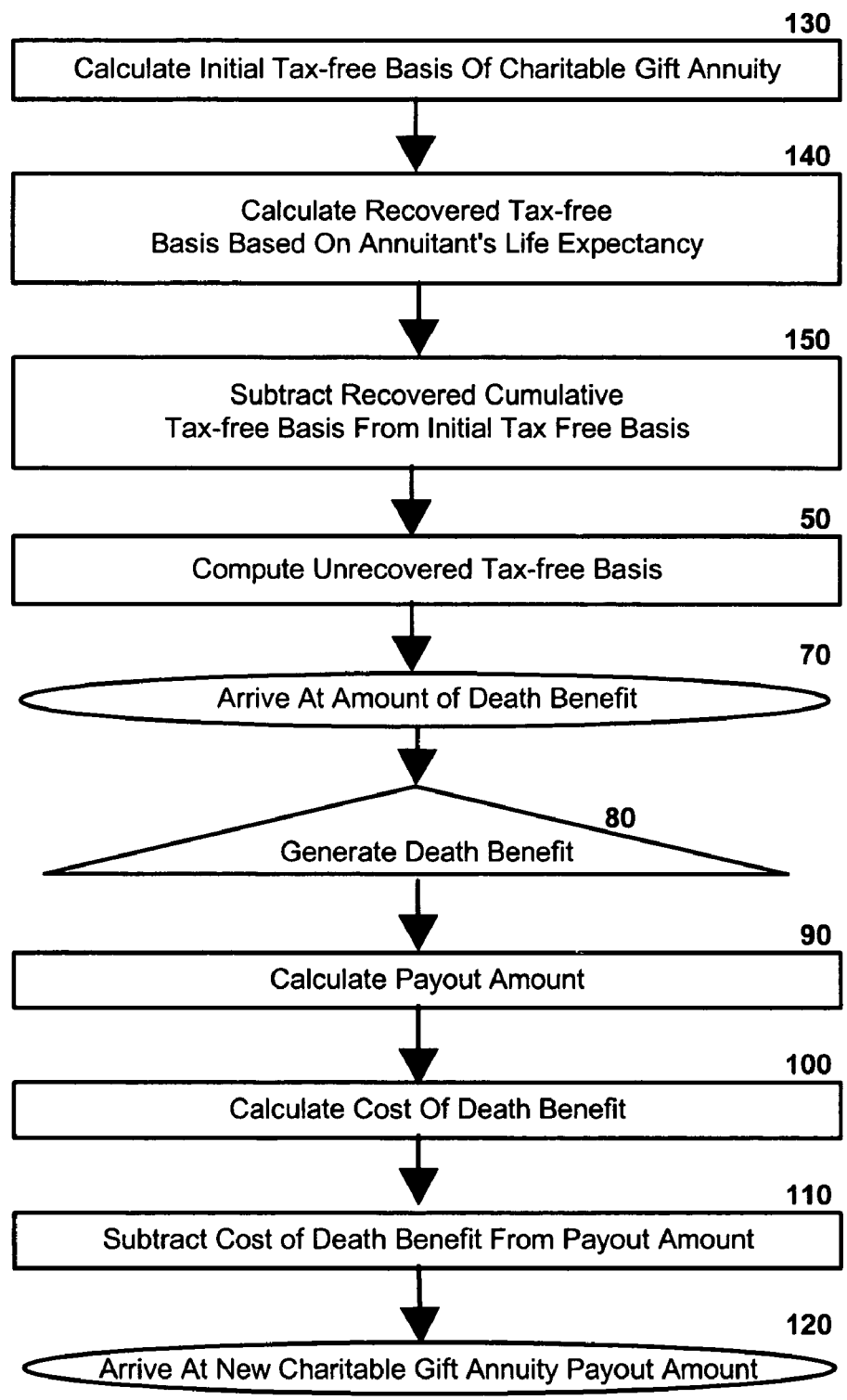
Figure 3:
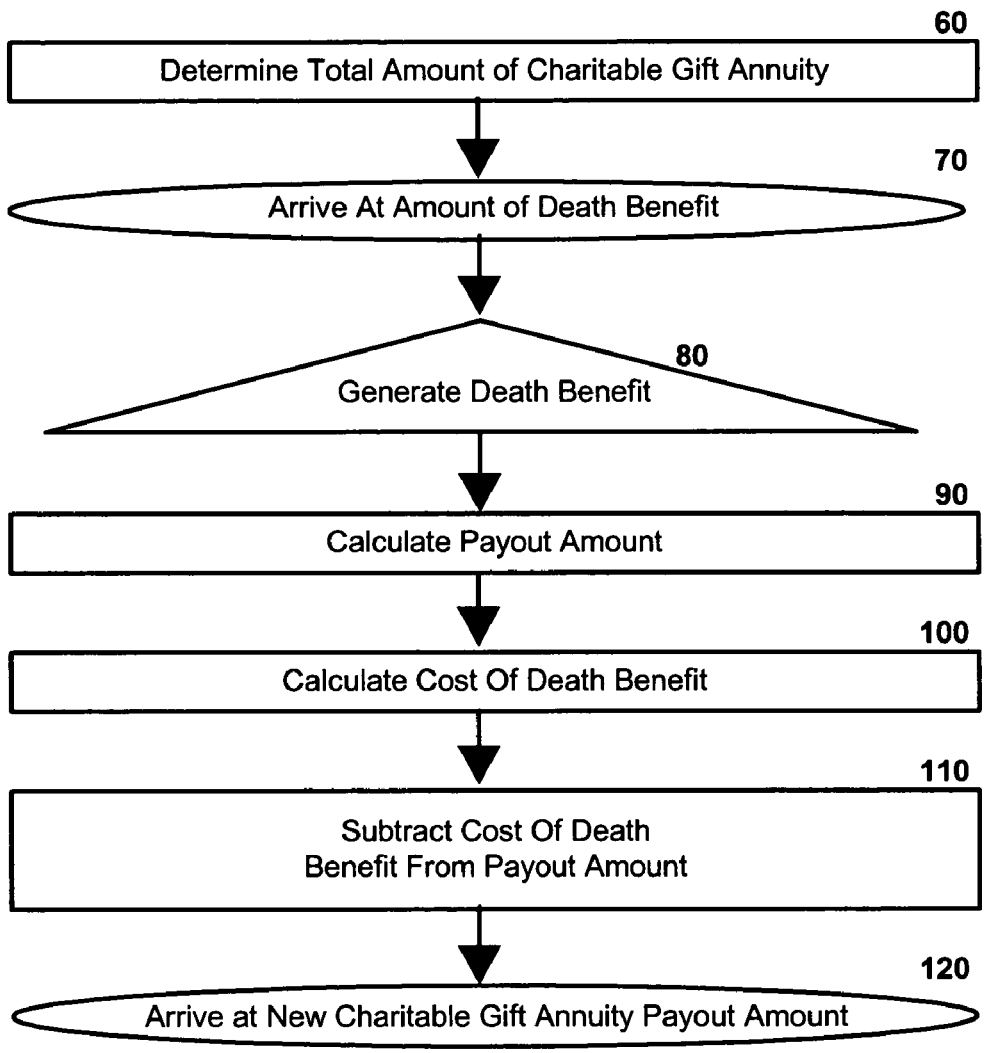

FIG. 1 illustrates an overview of the method that determines the amount of death benefit funded on an after-tax basis and arrives at a new charitable gift annuity payout amount according to the presently preferred embodiment of the present invention;

FIG. 2 illustrates a method for determining the amount of the death benefit funded on the after-tax basis to replenish the unrecovered tax-free basis of return of the charitable gift annuity and for arriving at a new charitable gift payout amount; and FIG. 3 illustrates a method for determining the amount of the death benefit funded on the after-tax basis to replenish the total amount of the charitable gift annuity and for arriving at a new charitable gift payout amount.

DETAILED DESCRIPTION OF THE DRAWINGS

Turning now to FIG. 1. At step 10, the charitable gift annuity contract is issued. The charitable gift annuity can be any combination of terms, including but not limited to a combination of: immediate, deferred, tuition or college, flexible or deferred payment; or single life, two lives in succession, or joint and survivor agreements. The present invention refers to a charitable gift annuity; however, the charitable gift annuity can be any type of gift annuity in which the participating organization or charity is recognized as a 501 (c3) organization by the Internal Revenue Service.

At step 20, it is determined whether the wealth replacement rider has been selected. The process of determining whether the wealth replacement rider has been selected comprises reading an entry on an application, field in a database, check box on a form, or the like by which an agent, computer, database equipment, or the like can determine that the wealth replacement rider has been selected. The charitable gift annuity has as part of the application process or contract a place for the gift annuitant to select the wealth replacement rider. The wealth replacement rider can be selected at any time during the application process or contract existence, but is presently referred to as being selected at the time the charitable gift annuity contract originates.

The wealth replacement rider can be selected in any form, including but not limited to, a check box in a display, a record entry in a database, or the like in which a computer, file, agent, database or the like can determine whether the gift annuitant or donor has selected the wealth replacement rider. The death benefit is referred to as being part of the wealth replacement rider; however, the present invention does not limit the use of the death benefit to a rider or an amendment to an insurance or charitable gift annuity contract. The death benefit can be a stand alone policy or an incorporated part of an original charitable gift annuity or life insurance contract.

At step 30, after having determined that the wealth replacement rider has not been selected, the charitable gift annuity payout and any costs associated with the charitable gift annuity is calculated in the standard method for which it has been established.

If the wealth replacement rider has been selected then at step 40, the type of death benefit coverage selected by the gift annuitant or donor is determined by reading, including but not limited to, a check box in a display, a field in a database, an entry in a computer file, or the like that shows that the gift annuitant or donor has selected a type of death benefit coverage. The charitable gift annuitant or donor may select from death benefit coverages, including but not limited to, the following: death benefits equal to the total amount of the charitable gift annuity available to the beneficiaries upon death of the gift annuitant or death benefits equal to the amount of unrecovered tax-free return basis available to beneficiaries if the gift annuitant dies prior to reaching his/her life expectancy.

At step 50, if the gift annuitant has selected to fund a death benefit equal to the unrecovered tax-free return basis, computer software, processing equipment or the like calculates the unrecovered tax-free return basis. If the gift annuitant selects to fund a death benefit based on the unrecovered tax-free basis of the charitable gift annuity, then step 60 does not occur.

At step 60, if the gift annuitant has selected to fund a death benefit equal to the total amount of the charitable gift annuity, the total amount of the charitable gift annuity is determined. The process of determining the total amount of the charitable gift annuity comprises reading a field in a database system, entry on an application, amount of a monetary instrument or the like which shows that the gift annuitant or donor has agreed to give a specific amount or which shows that the gift annuitant or donor has given a specific amount for the charitable gift annuity. If the gift annuitant selects to fund a death benefit equal to the total amount of the gift annuity, then step 50 does not occur.

In step 70, arriving at the amount of the death benefit is based on the type of death benefit coverage calculated in step 50 or 60. In step 80, the death benefit is generated according to the amount of the death benefit arrived at in step 70.

At step 90, the charitable gift annuity payout amount is calculated. A computer, data processing system, software program, or the like calculates the payout amount based on the age and number of annuitant(s), the annuity rate, and the federal discount rate. Generally, the American Council on Gift Annuities' life expectancy tables and payout rates are used to calculate the charitable gift annuity payout amount.

In step 100, the cost of the death benefit cost is calculated based on the previously determined type of death benefit coverage. A computer, data processing system, or the like calculates the cost of the death benefit based on various actuarial assumptions and insurance costs.

In step 110, the cost of the death benefit is subtracted from the charitable gift annuity's payout amount to arrive at the new charitable gift annuity's payout amount, in step 120.

FIG. 2 shows an illustration for determining the amount of the death benefit funded on the after-tax basis to replenish the unrecovered tax-free basis of return of the charitable gift annuity and for arriving at a new charitable gift payout amount In step 130, the initial tax-free basis is generally calculated by a computer, data processor, or the like. The initial tax-free basis is determined by the exclusion ratio percentage. The exclusion ratio equals the annuity contract value divided by the total expected return. The annuity contract value is the initial gift amount deducted from the total amount of the charitable gift annuity. The initial gift amount is a function of the age of the annuitant(s), annuity rate selected, and the federal discount rate.

In step 140, the recovered cumulative tax-free basis is calculated by adding recovered tax-free amounts from the date the contract is issued until the estimated last payment will be received. The recovered cumulative tax-free basis is calculated in projected increments over a time-span to show the estimated recovered cumulative tax-free basis at various time intervals over the gift annuitant's life expectancy.

In step 150, the recovered cumulative tax-free basis is subtracted from the initial tax-free basis to compute the unrecovered tax-free basis in step 50. In step 70, the amount of death benefit is equal to the unrecovered tax-free basis in step 50. The amount of the death benefit can be computed in projected time increments over the gift annuitant's life expectancy. At step 80, the death benefit is generated based on the death benefit amount arrived at in step 70.

At step 90, the charitable gift annuity payout amount is calculated. A computer, data processing system, software program, or the like calculates the payout amount based on the age and number of annuitant(s), the annuity rate, and the federal discount rate. Generally, the American Council on Gift Annuities' life expectancy tables and payout rates are used to calculate the charitable gift annuity payout amount.

In step 100, the cost of the death benefit is calculated based on the amount of the death benefit coverage determined in step 70. A computer, data processing system, software program, or the like calculates the cost of the death benefit based on various actuarial assumptions and insurance costs.

In step 110, the cost of the death benefit is subtracted from the charitable gift annuity payout amount to arrive at the new charitable gift annuity's payout, in step 120.

FIG. 3 shows an illustration for determining the amount of the death benefit funded on the after-tax basis to replenish the total amount of the charitable gift annuity and for arriving at a new charitable gift payout amount.

Beginning with step 60, the total amount of the charitable gift annuity is determined. The process of determining the total amount of the charitable gift annuity comprises reading a field in a database system, entry on an application, amount of a monetary instrument or the like which shows that the gift annuitant or donor has agreed to give a specific amount or which shows that the gift annuitant or donor has given a specific amount for the charitable gift annuity. At step 70, the amount of the death benefit arrived at based on the amount determined in step 60.

At step 80, the death benefit is generated based on the death benefit amount arrived at in step 70.

At step 90, the charitable gift annuity payout amount is calculated. A computer, data processing system, software program, or the like calculates the payout amount based on the age and number of annuitant(s), the annuity rate, and the federal discount rate. Generally, the American Council on Gift Annuities' life expectancy tables and payout rates are used to calculate the charitable gift annuity payout amount.

In step 100, the cost of the death benefit is calculated based on the amount of the death benefit coverage determined in step 70. A computer, data processing system, software program, or the like calculates the cost of the death benefit based on various actuarial assumptions and insurance costs.

In step 110, the cost of the death benefit is subtracted from the charitable gift annuity payout amount to arrive at the new charitable gift annuity's payout amount, in step 120.

Accordingly, the reader will see that the present invention provides a means for the gift annuitant to provide for surviving beneficiaries and heirs in the event that his/her expected life span is not reached. The present invention also provides a means for the gift annuitant to replenish the total gift amount for the benefit of beneficiaries upon his/her death.

The present invention further allows the charitable gift owner to harmonize gift giving with tax-advantaged strategies and guaranteed income while living and pass income to beneficiaries at death.

The present invention simplifies the financial planning process for the gift annuitant and provides a means to fund the death benefit and leave tax-free income to beneficiaries.

As previously mentioned, the method of the present invention is implemented within a computer or a data processing system and may be embodied in a software program or the like. The term "computer" includes every type of computer including, without limitation, a desktop computer, a laptop computer, a handheld computer, a personal digital assistant (PDA), and the like. The method of the present invention may be embodied in a computer software program that is embodied within a computer readable medium and that is operable to be executed by a processor unit within a computer.

While the invention has been disclosed in its preferred forms, many modifications, additions, and deletions can be made therein without departing from the spirit and scope of the invention and its equivalent as set forth in the following claims.

I claim:

1. A method performed by a computer for preparing a gift annuity with a death benefit, the method determining the amount of the death benefit and new gift annuity payout, comprising:
    issuing a gift annuity;
    determining if the gift annuity includes a wealth replacement rider selected by the gift annuitant;
    if the wealth replacement rider has been selected, determining the type of death benefit coverage selected by the gift annuitant;
    calculating the amount of the death benefit for the type of death benefit coverage selected;
    (a) if the type of death benefit coverage selected by the gift annuitant is the unrecovered tax-free basis of the gift annuity, calculating the amount of the death benefit by:
    calculating the initial tax-free basis of the gift annuity;
    calculating the recovered tax-free basis based on the annuitant's life expectancy;
    subtracting the recovered tax-free basis from the initial tax-free basis;
    (b) if the type of death benefit coverage selected by the gift annuitant has been the total amount of the gift annuity, determining the amount of the death benefit by:
    (1) generating the death benefit;
    (2) calculating the new gift annuity payout by:
    calculating initial gift annuity payout;
    calculating cost of death benefit;
    subtracting cost of death benefit from the initial gift annuity payout; and
    determining the new gift annuity payout amount;
    wherein the steps of the method are performed by a computer.

2. The method of claim 1 wherein said gift annuity contract is a charitable gift annuity contract.

3. The method of claim 1 wherein said gift annuity contract is entered in with an organization recognized as a charitable organization by the Internal Revenue Service.

4. The method of claim 1 wherein life expectancy variables are based on variables set by The American Council on Gift Annuities at the date the gift annuity was funded.

5. The method of claim 1 wherein said death benefit is a tax-free benefit to the additional beneficiary.

6. A method performed by a computer that determines an amount of a death benefit funded on an after-tax basis to replenish an unrecovered tax-free basis of return of a gift annuity contract and that determines a new gift annuity payout amount, the method comprising:
    (a) calculating an initial tax-free basis of a gift annuity contract;
    (b) calculating a recovered cumulative tax-free basis based on an annuitant's life expectancy;
    (c) subtracting the recovered cumulative tax-free basis from the initial tax-free basis;
    (d) determining an unrecovered tax-free basis; and
    (e) selecting the amount of death benefit to be equal to the unrecovered tax-free basis;
    wherein the steps of the method are performed by a computer.

7. The method of claim 6 further comprising the steps of:
    (a) generating a death benefit based on the amount of death benefit selected to be equal to the unrecovered tax-free basis;
    (b) calculating a first gift annuity payout amount;
    (c) calculating a cost of the death benefit;
    (d) subtracting the cost of the death benefit from the gift annuity payout amount; and
    (e) determining a second gift annuity payout amount that is equal to the first gift annuity payout amount less the cost of the death benefit
    wherein the steps of the method are performed by a computer.

8. The method of claim 7 wherein the gift annuity contract is a charitable gift annuity contract.

9. The method of claim 7 wherein the gift annuity contract is entered in with an organization recognized as a charitable organization by the Internal Revenue Service.

10. The method of claim 7 wherein life expectancy variables are based on variables set by The American Council on Gift Annuities at the date the gift annuity was funded.

11. The method of claim 7 wherein the death benefit is a tax-free benefit to an additional beneficiary.

12. A computer program embodied on a computer readable medium and operable to be executed by a processor, the computer program comprising computer readable program code for:
    issuing a gift annuity;
    determining if the gift annuity includes a wealth replacement rider selected by the gift annuitant;
    if the wealth replacement rider has been selected, determining the type of death benefit coverage selected by the gift annuitant;
    calculating the amount of the death benefit for the type of death benefit coverage selected;
    (a) if the type of death benefit coverage selected by the gift annuitant is the unrecovered tax-free basis of the gift annuity, calculating the amount of the death benefit by:
    calculating the initial tax-free basis of the gift annuity;
    calculating the recovered tax-free basis based on the annuitant's life expectancy;
    subtracting the recovered tax-free basis from the initial tax-free basis;
    (b) if the type of death benefit coverage selected by the gift annuitant has been the total amount of the gift annuity, determining the amount of the death benefit by:

(1) generating the death benefit;
(2) calculating the new gift annuity payout by:
calculating initial gift annuity payout;
calculating cost of death benefit;
subtracting cost of death benefit from the initial gift annuity payout; and
determining the new gift annuity payout amount.

13. The computer program of claim 12 wherein the gift annuity contract is a charitable gift annuity contract.

14. The computer program of claim 12 wherein the gift annuity contract is entered in with an organization recognized as a charitable organization by the Internal Revenue Service.

15. The computer program of claim 12 wherein life expectancy variables are based on variables set by The American Council on Gift Annuities at the date the gift annuity was funded.

16. The computer program of claim 12 wherein the death benefit is a tax-free benefit to an additional beneficiary.

17. The computer program of claim 15 wherein the computer readable program code further determines an amount of a death benefit funded on an after-tax basis to replenish an unrecovered tax-free basis of return of a gift annuity contract and that determines a new gift annuity payout amount, the computer program comprising computer readable program code for:

(a) calculating an initial tax-free basis of a gift annuity contract;
(b) calculating a recovered cumulative tax-free basis based on an annuit' life expectancy;
(c) subtracting the recovered cumulative tax-free basis from the initial tax-free basis;
(d) determining an unrecovered tax-free basis; and
(e) selecting the amount of death benefit to be equal to the unrecovered tax-free basis.

18. The computer program of claim 17, wherein the computer program further comprises computer readable program code for:

(a) generating a death benefit based on the amount of death benefit selected to be equal to the unrecovered tax-free basis;
(b) calculating a first gift annuity payout amount;
(c) calculating a cost of the death benefit;
(d) subtracting the cost of the death benefit from the gift annuity payout amount; and
(e) determining a second gift annuity payout amount that is equal to the first gift annuity payout amount less the cost of the death benefit.

* * * * *